No. 657,951. Patented Sept. 18, 1900.
W. MOONEY.
PROCESS OF TREATING DEEP WELLS, &c.
(Application filed July 31, 1899.)
(No Model.)
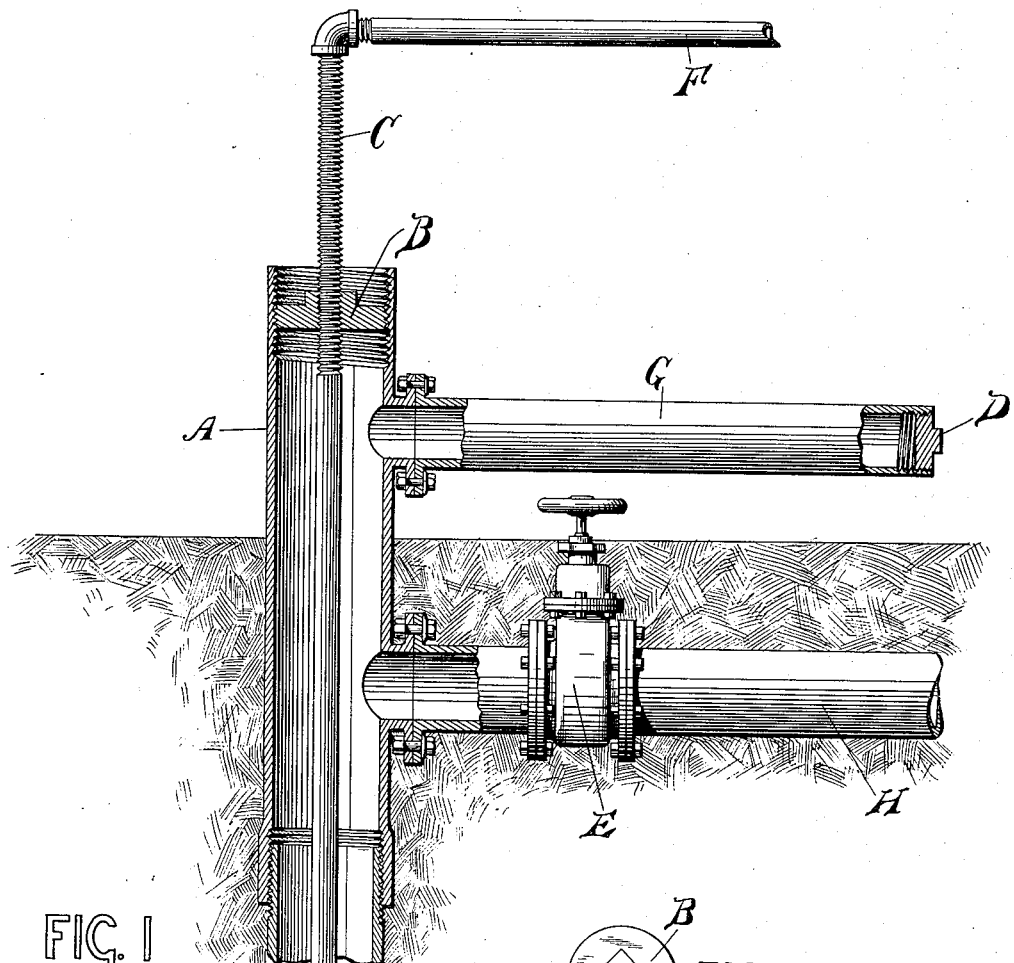
FIG. 1
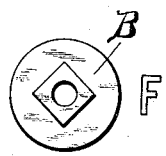
FIG. 2
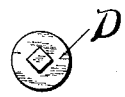
FIG. 4
FIG. 3
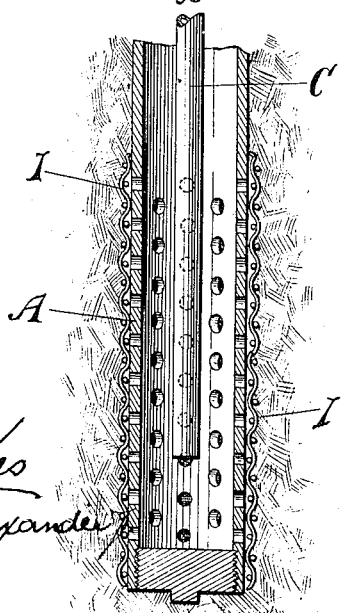
William Mooney
INVENTOR
BY Michael J. Tansey,
ATTORNEY
WITNESSES:
Henry C. Lees
Samuel C. Alexander

UNITED STATES PATENT OFFICE.

WILLIAM MOONEY, OF ATLANTIC HIGHLANDS, NEW JERSEY.

PROCESS OF TREATING DEEP WELLS, &c.

SPECIFICATION forming part of Letters Patent No. 657,951, dated September 18, 1900.

Application filed July 31, 1899. Serial No. 725,689. (No specimens.)

*To all whom it may concern:*

Be it known that I, WILLIAM MOONEY, a citizen of the United States, residing at Atlantic Highlands, in the township of Middletown, county of Monmouth, and State of New Jersey, have invented a certain new and useful process of treating all kinds of Artesian or deep wells of whatever character in order to obtain from them a constant and sure supply of water, oil, gas, or any other substance wells may have yielded, of which the following is a specification.

In the use of all kinds of Artesian or deep wells it has been found that after a time many flow only partially as compared with first flow, while others entirely refuse to yield. These conditions are caused principally by the water, oil, or gas, as the case may be, in entering inlets of a well or wells carrying with it sand or earth, together with organic and mineral matter held in suspension, a portion of which is being constantly deposited in the meshes of the screen encircling the well-tube or in the openings or inlets of the well or wells, thus in time either wholly or partially closing said meshes, openings, or inlets, thereby creating resistance to internal pressure and preventing water, oil, or gas, as the case may be, from entering the well either wholly or partially.

My process is first to make the well or wells to be developed perfectly air-tight, so that no power can escape from the upper part thereof, then of applying high pressure of one hundred or two hundred pounds to the square inch to the inside of well-tubing, which pressure is compelled to act upon the openings at the bottom of well and in the screen surrounding said well, which have become clogged by reason of earthy deposits, as aforesaid, and said pressure being much in excess of the natural pressure will overcome the latter, and thus force open the inlets at the bottom of the well and in the meshes of the screen and also open up the strata of earth surrounding said well, which after said pressure is removed will permit the natural pressure to act freely, thus causing the water, gas, or oil, as the case may be, to enter the well without difficulty.

The annexed drawings illustrate the method of applying my invention and the several parts necessary for obtaining the result desired.

Figure 1 shows apparatus in position for applying pressure. A, Fig. 1, is well-casing of Artesian well, with holes or inlets in lower sides thereof and screw-thread cut in upper inside part thereof. B is a screw-plug made of cast-iron, wrought-iron, or brass, but preferably cast-iron, one inch thick through center, with screw-thread cut on outside edge thereof to engage screw-thread on inside of well-casing A; also, with hole drilled through center, in which a screw-thread is cut to engage screw-thread on pressure-pipe C; also, with nut elevation to receive wrench when turning. C is pressure-pipe, about one inch in diameter, made, preferably, of wrought-iron and long enough to reach almost to bottom of well. Upon the upper outside part of C is a screw-thread which extends down about eight inches from the top, which is intended to engage the screw-thread in the hole through the center of the plug B and also to receive the connection of F. D is a solid cast-iron, wrought-iron, or brass (preferably cast-iron) screw-plug about one inch thick through the center, upon the outside edge of which there is a screw-thread cut to engage the thread on the inside of the outer end of the discharge-pipe G and with nut elevation to receive the wrench when turning. E is a gate-valve, which regulates communication between well A and other wells of the system, if any exist. F is pipe through which power is transmitted to pressure-pipe C. G is discharge-pipe of well A and has screw-thread cut in inside of the outer end thereof to engage the screw-thread on outer edge of plug D. H is the main pipe or pipe connecting well A with other wells of the system, if any exist. I is the screen around bottom part of well to prevent sand and other foreign substances from entering.

Fig. 2 shows top view of screw-plug B, Fig. 1, with nut elevation to receive the wrench in turning and threaded hole in center through which pressure-pipe is inserted.

Fig. 3 shows pressure-pipe C, Fig. 1, detached and reduced, with screw-thread cut on upper outside part thereof to engage center thread of screw-plug B.

Fig. 4 shows top view of screw-plug D, with nut elevation to receive wrench in turning.

Pressure-pipe C, Fig. 3, is first inserted in well A, Fig. 1. Then screw-plug B, Fig. 2, is screwed onto pressure-pipe C and then screwed into top of well-casing A. Solid plug D is next screwed securely into end of discharge-pipe G, and gate-valve E in main pipe between well and cistern, if there is one, is closed. Connection is then made between pipe F, attached to machinery for producing power, and pressure-pipe C, when well will be air-tight and ready to receive pressure. Having made the well A perfectly air and water tight, pressure is communicated to well A through pipe F and pressure-pipe C until the well becomes charged with agent used, (which may be air, water, gas, or any other available compressible force, but preferably compressed air,) and the pressure exerted thereby is from one hundred to two hundred pounds to the square inch upon the inside of well. Said high pressure is continued from ten to sixty minutes, according to circumstances. The pressure thus exerted will be much in excess of the internal or natural pressure (probably about five to one) and will therefore overcome the upward internal pressure, forcing open the inlets in the lower part of the well and meshes in screen and finding its way through paths of least resistance, which will be the different watercourses, channels, or cavities in the earth. The effect of this will be that the inlets to well and meshes of screen will be freed from earthy deposits and the said channels, cavities, and watercourses will be cleared out and opened, giving water, gas, or oil free access to the well and permitting internal pressure to act freely thereafter.

I claim Letters Patent for—

The method of clearing Artesian or deep wells by the application of an external pressure to the bottom and sides thereof, in excess of internal or natural pressure as set forth and described.

WILLIAM MOONEY.

Witnesses:
  CHARLES R. SNYDER,
  ROBERT G. POOLE.